United States Patent [19]

Himeno et al.

[11] Patent Number: 4,734,101

[45] Date of Patent: Mar. 29, 1988

[54] RED BENZOTHIAZOLE MONOAZO DYE FOR POLYESTER FIBER, MIXED DYE CONTAINING THE SAME, AND METHOD OF DYEING POLYESTER FIBER USING THE SAME

[75] Inventors: Kiyoshi Himeno; Junji Yoshihara; Masateru Ishida, all of Kitakyushu, Japan

[73] Assignee: Mitsubishi Chemical Industries Limited, Tokyo, Japan

[21] Appl. No.: 946,964

[22] Filed: Dec. 29, 1986

[30] Foreign Application Priority Data

Dec. 30, 1985 [JP] Japan .................. 60-298484

[51] Int. Cl.$^4$ .................. C09B 29/04; C09B 67/22
[52] U.S. Cl. .................................. 8/524; 8/639; 8/691; 8/922; 534/575; 534/788
[58] Field of Search ............ 534/575, 788; 8/639, 8/524

[56] References Cited

U.S. PATENT DOCUMENTS 4,369,324 1/1983 Horstmann et al. ............ 548/164

FOREIGN PATENT DOCUMENTS 167913 1/1986 European Pat. Off. .
1770932 8/1976 Fed. Rep. of Germany .
1324235 11/1969 United Kingdom .

Primary Examiner—A. Lionel Clingman
Attorney, Agent, or Firm—Jordan B. Bierman

[57] ABSTRACT

A monoazo dye for polyester fiber represented by formula

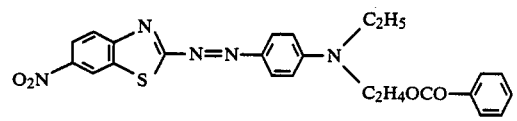

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 25.3°, and 26.8°. The monoazo dye exhibits excellent dispersibility to effect level dyeing even under high temperature and severe conditions and provides a dyed material excellent in light fastness and rubbing fastness, as well as wet fastness after post-finish.

9 Claims, 2 Drawing Figures

RED BENZOTHIAZOLE MONOAZO DYE FOR POLYESTER FIBER, MIXED DYE CONTAINING THE SAME, AND METHOD OF DYEING POLYESTER FIBER USING THE SAME

FIELD OF THE INVENTION

This invention relates to a monoazo dye for polyester fiber. More particularly, this invention relates to a monoazo dye of red hue with which polyester fibers can be dyed uniformly even under severe conditions of high temperatures to provide dyed polyester fibers excellent in light fastness and rubbing fastness, as well as wet fastness after post-finish, such as polyurethane finish and silicone finish.

BACKGROUND OF THE INVENTION

In the field of dyeing, methods for dyeing have recently underwent rationalization. For example, jet dyeing capable of processing a large quantity of fiber in one lot has been broadly employed for dyeing of polyester fiber with disperse dyes. Jet dyeing is generally carried out in a beam dyeing system, a cheese dyeing system, a package dyeing system, and the like.

According to these dyeing methods, a dye dispersion is forcedly circulated in a stationary dense layer of fiber formed by winding fiber so many times. Therefore, the dye particles dispersed in a dye bath to be used in these methods are required to have a smaller size and to exhibit more excellent dispersion stability than in the conventional dyeing methods. In other words, if the dye particles are too large, their passage through the fiber layer is inhibited so that the dye does not sufficiently penetrate deep into the inside of the layer, flocculates resulting in uneven dyeing between the inner layer and the outer layer or adheres to the outer surface of the fiber layer resulting in reduction in color fastness, such as rubbing fastness. Thus, the dyestuff which can be applied to these dyeing methods should have satisfactory dispersibility in a dye bath and also undergo no reduction in dispersibility in a broad temperature range of from room temperature to a high temperature at which dyeing actually occurs.

In general, however, dye dispersibility in a dye bath is liable to decrease upon heating the bath to a high temperature. As a result, the dye particles flocculate and adhere onto the surface of a material to be dyed as a filter cake. In the case where a material to be dyed forms a dense layer as described above, the dye concentration differs between the outer layer portion and the inner layer portion, failing to obtain level dyeing.

On the other hand, with the recent demand for saving resources and energy, dyeing conditions are being made more severe by lowering a liquor ratio (dyed materials to dyeing liquor) of a dye bath, e.g., from 1:30 to 1:10; decreasing a ratio of dye cake to dispersing agent, e.g., from 1:3 to 1:1; reducing the dyeing time and rising the dyeing temperature, e.g., from 130° C.×1 hour to 135° C.×0.5 hour; and the like. Since such increased severity in any dyeing condition is disadvantageous to dispersion stability of dyes, not a few disperse dyes whose dispersion stability has been relatively sufficient for the conventional dyeing methods are not satisfactory when used in the latest rationalized dyeing methods with the above-described increased severity.

More specifically, benzothiazole type monoazo dye of red hue represented by formula (I)

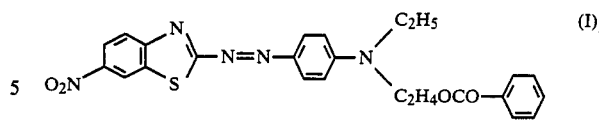

is a compound obtained by reacting a diazo component and a coupling component in a usual manner, and its chemical structure per se is disclosed in British Pat. No. 1,324,235. The monoazo dye of formula (I) is capable of uniformly dyeing polyester fiber when used under conventional mild dyeing conditions. However, when the monoazo dye of formula (I) is used for dyeing of polyester fiber under the above-described rationalized severe conditions, its dispersibility seriously reduces, making it very difficult to achieve level dyeing. Even if dyeing is conducted under mild conditions, the resulting dyed materials do not have sufficient color fastness to light and rubbing, leaving room for further improvements. Further, the monoazo dye of formula (I) involves another problem of affinity for various dyeing assistants. For example, it exhibits extremely poor dispersion stability at high temperatures in the presence of sodium sulfate, which leads to unlevel dyeing in systems combined with reactive dyes containing sodium sulfate for dyeing of polyester/cotton blended fabric. In case of using as mixed dyes, poor affinity for other dyes causes color variation or unlevel dyeing.

Furthermore, in recent years, the surface of the fabric after dyeing is often subjected to post-finishing for the purpose of feeling improvement, waterproofing, and static charge prevention, such as polyurethane finish, silicon finish, etc. During the post-finishing, there is a tendency that the dye adsorbed on the polyester fiber undergoes bleeding to cause reduction in wet fastness. Therefore, it has also been demanded to develop dyes which exhibit satisfactory wet fastness even after post-finish.

As a result of extensive studies, it has now been found that the benzothiazole type monoazo compound represented by formula (I) has at least two crystal modifications, one of which is not so satisfactory in dispersion stability under a high temperature dyeing condition, while the other exhibits very satisfactory dispersion stability even under high temperature and severe dyeing conditions and that the cake obtained through ordinary synthetic reactions has the former crystal modification. It has been further found that dispersion stability of a dye composition in a high temperature bath is not only decided by the size of dye particles but also greatly depends on the above-described crystal modification. Based on these findings, the inventors have reached the conclusion that a stable dispersion system of a dye bath can first be attained by using the compound having the novel and preferred one of the aforesaid two crystal modifications.

As a result of continued investigations on the above-described monoazo dye having a specific crystal modification, it has been furthermore found that in cases where the monoazo dye of formula (I) having a specific crystal modification is mixed with other dyes, its excellent effects can be manifested exclusively when mixed with monoazo dyes having a specific structure hereinafter described.

SUMMARY OF THE INVENTION

One object of this invention is to provide a monoazo dye for polyester fiber with which polyester fiber can be dyed uniformly even under severe conditions.

Another object of this invention is to provide a monoazo dye for polyester fiber which is excellent in light fastness and rubbing fastness.

A further object of this invention is to provide a monoazo dye for polyester fiber which exhibits excellent wet fastness even after post-finish of dyed materials.

This invention relates to a monoazo dye represented by formula (I) hereinafter described and having a crystal modification characterized by its X-ray diffraction spectrum (CuKα) showing a very strong peak at an angle of diffraction (2θ) of about 14.2°, a strong peak at about 24.5°, and four weak peaks at about 16.9°, 23.6°, 25.3°, and 26.8° (hereinafter referred to as α-modification); and to a mixed dye comprising the above-described dye of formula (I) and a monoazo dye represented by formula (IV) hereinafter described.

Formula (I) is represented by

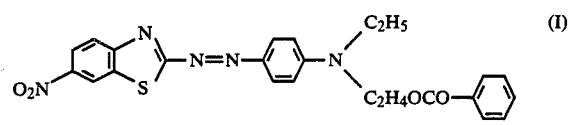

Formula (IV) is represented by

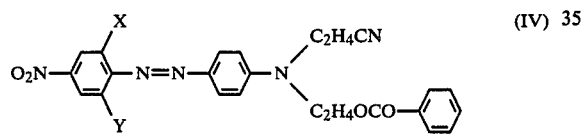

wherein X and Y each represents a hydrogen atom or a chlorine atom.

According to the present invention there is to provide a process for preparation of a monoazo dye and a process for dyeing polyester fibers with a monoazo dye and a mixed dye thereof.

BRIEF DESCRIPTION OF THE ACCOMPANYING DRAWINGS

DETAILED DESCRIPTION OF THE INVENTION

The monoazo compound having the novel α-modification according to the present invention can be synthesized by diazotizing a compound represented by formula (II)

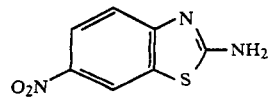

in a usual manner and reacting the resulting diazo compound with a coupling compound represented by formula (III)

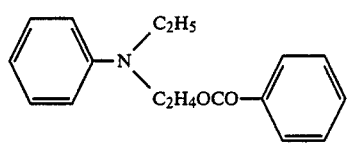

in an aqueous medium at a temperature of from 0° to 15° C., and preferably from 0° to 10° C., for a period of from 0.5 to 10 hours to obtain a monozao compound of formula (I) which has β-modification and then treating this compound under specific conditions to convert to the α-modification. The transition from the β-modification to the α-modification can be effected by, for example, a process comprising treating the compound of β-modification as dispersed in an aqueous medium by stirring at a temperature of from 60° to 130° C., and preferably from 80° to 100° C., for a period of from 0.5 to 30 hours, and perferably from 1 to 10 hours, in the absence or presence of a dispersing agent, such as a condensate between naphthalenesulfonic acid and formaldehyde, a concentrated sulfate pulp waste liquor mainly comprising sodium lignin sulfonate, etc.; or a process comprising stirring the compound of β-modification as dispersed in an organic solvent, such as alcohols (e.g., methanol, ethanol, butanol, etc.), ethers (e.g., dioxane, etc.), ethylene glycol, glycol ether, etc., at a temperature of from 15° to 100° C., and preferably from 20° to 80° C., for a period of from 0.5 to 10 hours; or the like technique. Alternatively, the monoazo compound of α-modification can be obtained directly by coupling reaction between the compound of formula (II) and the compound of formula (III) in an organic solvent, e.g., methanol.

Figure 1:
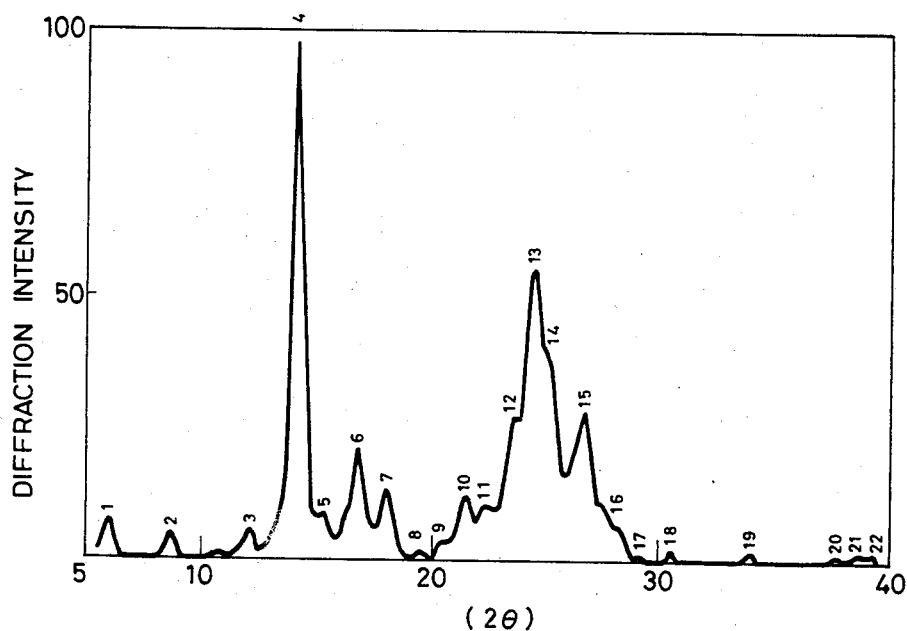
FIG. 1 is an X-ray diffraction spectrum of the monoazo compound of α-modification prepared in Preparation Example 1 of the present invention.
Figure 2:
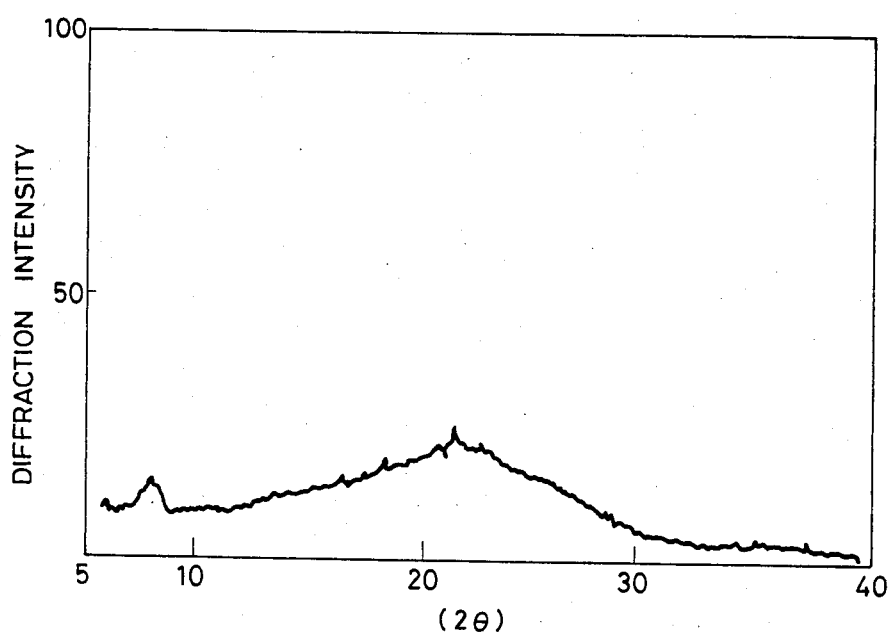
FIG. 2 is an X-ray diffraction spectrum of the monoazo compound having a crystal modification nearly amorphous (hereinafter referred to as β-modification) prepared in Preparation Example 1 of the present invention. In these figures, the abscissa represents an angle of diffraction (2θ), and the ordinate represents a diffraction intensity.

The α-modification according to the present invention and the conventional β-modification in the monoazo compound represented by formula (I) will be described below with reference to the accompanying drawings. FIGS. 1 and 2 each illustrates a powder X-ray diffraction spectrum obtained by recording the state of diffraction by CuKα rays by means of a proportional counter, in which the abscissa and ordinate represent an angle of diffraction (2θ) and X-ray intensity, respectively. The spectrum of FIG. 1 is of an α-modification, a novel crystal modification according to the present invention, indicating one very strong peak at an angle of diffraction (2θ) of about 14.2°, one strong peak at about 24.5°, and four weak peaks at about 16.9°, 23.6°, 25.3°, and 26.8°. The spectrum of FIG. 2 is of the conventionally known β-modification, sharply differing from the α-modification of FIG. 1. These spectra clearly shows a difference of crystal modification because the angle of diffraction in X-ray diffractometry of the same crystal form is always consistent with an error of about ±0.1°. This difference of crystal form results in difference of behavior of the monoazo compound during dyeing. Thus, satisfactory dyeing can be achieved even in accordance with the dyeing methods employing high temperature and severe conditions by using the monoazo compound having the α-modification.

The above-described monoazo dye of formula (I) produces excellent effects on light fastness and rubbing fastness as well as on wet fastness after dyed fabric is subjected to post-finishing, such as polyurethane finish, silicon finish, and the like.

While dyes of red hue may be used individually in many cases, they are also used in combination with other known dyes in order to obtain a desired hue or desired color fastness. When the monoazo dye of the present invention is used as a mixed dye with other dyes, the above-mentioned excellent effects cannot be exerted in some cases depending on the kind of the dye with which to mix. In particular, when the monoazo dye of formula (I) is mixed with dyes of orange hue, the resulting mixed dye has considerably deteriorated wet fastness.

Hence, it is preferable that the monoazo dye of α-modification of formula (I) be mixed with a monoazo dye of orange hue represented by formula (IV)

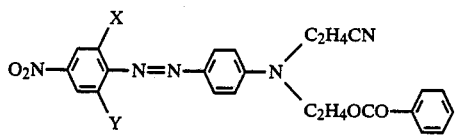
(IV)

wherein X and Y each represents a hydrogen atom or a chlorine atom.

The monoazo dyes of formula (IV) also have several crystal modifications, but satisfactory results can be secured irrespective of the crystal modification.

The monoazo dyes of formula (IV) are known compounds as disclosed, e.g., in Japanese Patent Publication Nos. 4212/68 and 15310/68, and can be obtained by diazotizing a compound represented by formula (V)

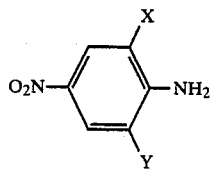
(V)

wherein X and Y are as defined above, and reacting the resulting compound with a coupling component represented by formula (VI)

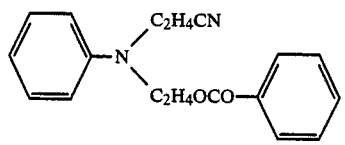
(VI)

A mixing ratio of the monoazo dye of formula (I) to the monoazo dye of formula (IV) usually ranges from 10:90 to 90:10, and preferably from 50:50 to 90:10, by weight.

Fibers which can be dyed with the benzothiazole type monoazo dye according to the present invention include polyester fibers comprising polyethylene terephthalate, a polycondensate of terephthalic acid and 1,4-bis(hydroxymethyl)cyclohexane, etc., and blended or combined fabric of these polyester fibers and natural fibers, such as cotton, wool, etc.

Dyeing of polyester fibers with the monoazo dye of the invention can be carried out by dispersing the dye in an aqueous medium with the aid of a known dispersing agent, e.g., a condensate of naphthalenesulfonic acid and formaldehyde, a higher alcohol sulfate, a higher alkylbenzenesulfonate, etc., in a usual manner to prepare a dye bath or a color paste and performing dip dyeing or printing. For dip dyeing, applicable dyeing methods include high temperature dyeing, carrier dyeing, thermosol dyeing, and the like. Even if severe dyeing conditions are employed in these methods, the monoazo dye of the invention can provide satisfactorily dyed polyester fibers or blended fabric thereof because of its excellent dispersion stability.

Taking dip dyeing for instance, dyeing conditions that allow a full manifestation of the effects of the dye according to the present invention are from 125° to 140° C. in dyeing temperature, 15 times or less in liquor ratio (a weight ratio of a dye bath to a material to be dyed), and 1 or less in a weight ratio of a dispersing agent to a dye cake.

This invention will now be illustrated in greater detail with reference to the following examples. In these examples, all the percents and ratios are by weight unless otherwise indicated.

In these examples, polyurethane finish of dyed fiber was carried out by dipping the fiber in a 1% solution of "Hydran F-24K" (a trade name of a urethane resin solution for surface finish, produced by Dai-Nippon Ink & Chemicals, Inc.), followed by curing at 160° C. for 2 minutes.

Color fastness of dyestuffs were determined in accordance with the following test methods.

(1) Washing Fastness:

A polyurethane-finished dyed material accompanied by nylon multi-fiber was subjected to a washing test in accordance with AATCC Standard, Washing IIA. The degree of staining of the nylon fiber was evaluated by a gray scale.

(2) Fastness to Perspiration (Alkaline):

A polyurethane-finished dyed material accompanied by nylon cloth and silk cloth was tested in accordance with JIS L-0848A. The degree of staining of the silk cloth was evaluated by a gray scale.

(3) Wet Fastness:

A polyurethane-finished dyed material was tested in accordance with JIS L-0846A except that the sample was accompanied by silk cloth instead of nylon cloth. The degree of staining of the silk cloth was evaluated by a gray scale.

(4) Light Fastness:

Determined in accordance with JIS L-0842.

(5) Rubbing Fastness:

Determined in accordance with JIS L-0849 using a wet dyed material. Evaluation was made by a gray scale.

PREPARATION EXAMPLE 1

Preparation of Dye Crystals of Formula (I)

In 300 ml of 2% sulfuric acid was dispersed 5.4 g of N-ethyl-N-benzoyloxyethylaniline at 0° to 3° C. to prepare a coupling component solution.

In 60 ml of a 1:1 (by vol) solution of phosphoric acid and acetic acid was dissolved 5.1 g of 6-nitro-2-aminobenzothiazole and reacted with 42% nitrosyl sulfate at 0° C. for 2 hours for diazotization. The resulting diazo solution was added dropwise to the above-prepared coupling component solution. After reacting at 0° C. for 3 hours, the crystals precipitated were collected by filtration, washed with water, and dried to obtain 9.6 g of brown crystals. This product had an adsorption maximum ($\lambda_{max}$) in acetone at 544 nm. The powder of the resulting monoazo dye was analyzed by X-ray diffractometry and was found to have a β-modification. The X-ray diffraction spectrum obtained is shown in FIG. 2.

The crystals of β-modification were dispersed in 20 times the volume of water, followed by stirring at 90° to 95° C. for 3 hours to transit the crystal form. After completion of the transition the dispersion was filtered, and the filter cake was dried. X-Ray diffractometry revealed that the resulting crystals have an α-modification as shown by its diffraction spectrum of FIG. 1.

PREPARATION EXAMPLE 2

Preparation of Dye Crystals of Formula (IV)

In 300 ml of 2% sulfuric acid was dispersed 5.8 g of N-cyanoethyl-N-benzoyloxyethylaniline at 0° to 3° C. to prepare a coupling component solution.

p-Nitroaniline (2.8 g) was subjected to diazotization in a usual manner by using nitrosyl sulfate in 10 ml of sulfuric acid at 0° C. for 2 hours to prepare a diazo solution. The resulting diazo solution was added dropwise to the above-prepared coupling component solution, followed by allowing the mixture to react at 0° C. for 3 hours. After the reaction, the crystals precipitated were collected by filtration, washed with water, and dried to obtain 8.4 g of orange crystals having the following formula. This product had $\lambda_{max}$ (in acetone) of 455 nm.

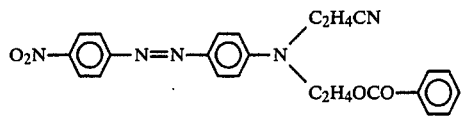

EXAMPLE 1

A dye bath was prepared by dispersing 0.5 g of the monoazo compound of α-modification as prepared in Preparation Example 1 in one liter of water containing 0.25 g of a naphthalenesulfonic acid-formaldehyde condensate and 0.25 g of a higher alcohol sulfate. 100 g of polyester fiber were dipped in the dye bath at 135° C. for 30 minutes, subjected to soaping, washed with water, and dried. The dye showed satisfactory dispersibility during dyeing to achieve level dyeing. The dyed polyester fiber exhibited very satisfactory color fastness, grading 6 in fastness to bluish red light and 5 in rubbing fastness. After polyurethane finishing, the dyed material graded 5 in wash fastness, 5 in fastness to perspiration (alkaline), and 5 in water fastness.

COMPARATIVE EXAMPLE 1

Dyeing of polyester fiber was carried out in the same manner as in Example 1 except for using the monoazo compound of β-modification as prepared in Preparation Example as an intermediate. Partial agglomeration of the dye occurred in the dye bath to cause unlevel dyeing. The resulting dyed material was so inferior in rubbing fastness as grading 1. Since the dyed material had no commercial value at all, other tests for color fastness were not conducted.

EXAMPLE 2 AND COMPARATIVE EXAMPLE 2

Test under Mild Dyeing Conditions

Dyeing of polyester fiber was carried out in the same manner as in Example 1 except that the dyeing conditions were made slightly milder by increasing the amount each of the naphthalene-sulfonic acid-formaldehyde condensate and the higher alcohol sulfate 3 times to 0.75 g, increasing the amount of water 3 times to 3 liters, and conducting the dip dyeing at 130° C. for 60 minutes.

As a result, level dyeing could be effected to satisfaction similarly to Example 1. The resulting dyed material exhibited excellent color fastness, grading 6 in light fastness and 5 in rubbing fastness. After the dyed material was finished with polyurethane, it graded 5 in washing fastness, 5 in fastness to perspiration (alkaline), and 5 in water fastness.

For comparison, the same procedure as described above was repeated except for using the monoazo compound of β-modification. Although a slight improvement could be seen, the resulting dyed material still showed non-uniformity in dyeing and graded 3 in rubbing fastness.

EXAMPLE 3

A dye bath was prepared by dispersing 0.25 g of the monoazo dye of α-modification as prepared in Preparation Example 1 and 0.25 g of the monoazo dye as prepared in Preparation Example 2 in one liter of water containing 0.25 g of a naphthalenesulfonic acid-formaldehyde condensate and 0.25 g of a higher alcohol sulfate. A hundred grams of polyester fiber was dipped in the resulting dye bath at 135° C. for 30 minutes, subjected to soaping, washed with water, and dried. The dye showed satisfactory dispersibility to effect level dyeing. The resulting dyed material had satisfactory color fastness, grading 6 in fastness to bluish red light and 5 in rubbing fastness. Wet fastness of the dyed material after polyurethane finishing is shown in Table 1.

COMPARATIVE EXAMPLE 3

Dyeing of polyester fiber was carried out in the same manner as in Example 3 except for using the monoazo compound of β-modification as prepared in Preparation Example 1 as an intermediate. However, partial flocculation of the dye occurred in the dye bath only to provide a non-uniformly dyed material grading 1 in rubbing fastness.

EXAMPLE 4 AND COMPARATIVE EXAMPLE 4

Test under Milder Dyeing Conditions

Dyeing of polyester fiber was carried out in the same manner as in Example 3 except that the dyeing conditions were made slightly milder by increasing the amount each of the naphthalene-sulfonic acid-formaldehyde condensate and the higher alcohol sulfate 3 times to 0.75 g, increasing the amount of water 3 times to 3 liters, and conducting the dyeing at 130° C. for 60 minutes. As a result, dyeing was effected to satisfaction, and the resulting dyed material showed excellent properties, grading 6 in light fastness and 5 in rubbing fastness.

For comparison, the same procedure as described above was repeated except for replacing the monoazo compound of β-modification with that of α-modification. The resulting dyed material still showed unlevel dyeing and graded 3 in rubbing fastness, though a slight improvement over the results of Comparative Example 3 could be seen.

perse R-145" produced by Nippon Kayaku Co., Ltd. or "CI-Disperse O-31" produced by Sumitomo Chemical Co., Ltd.). The resulting dyed material was subjected to polyurethane finish and wet fastness was evaluated. The results obtained are shown in Table 1.

TABLE 1

| Example No. | Mixed Dye (mixing Ratio) | Color Fastness After Polyurethane Finishing | | |
|---|---|---|---|---|
| | | Wash | Perspiration (alkaline) | Water |
| Example 3 | Monoazo dye of Formula (I) (α-modification)/ Monoazo dye of Formula (IV) (X, Y = H) (50:50) | 4–5 | 5 | 4–5 |
| Example 5 | Monoazo dye of Formula (I) (α-modification)/ Monoazo dye of Formula (IV) (X, Y = H) (70:30) | 5 | 5 | 5 |
| Comparative Example 5 | CI-Disperse R-145*/CI Disperse O-31** (50:50) | 1 | 1–2 | 1 |
| Comparative Example 6 | CI-Disperse R-145*/CI Disperse O-31** (70:30) | 1 | 1–2 | 1 |
| Comparative Example 7 | Monoazo dye of Formula (I) (α-modification)/ CI Disperse O-31 (50:50) | 2–3 | 3 | 2–3 |
| Comparative Example 8 | Monoazo dye of Formula (I) (α-modification)/ CI Disperse O-31 (70:30) | 3 | 3–4 | 3 |
| Comparative Example 9 | CI Disperse R-145/Monoazo dye of Formula (IV) (X, Y = H) (50:50) | 2 | 3 | 2 |
| Comparative Example 10 | CI Disperse R-145/Monoazo dye of Formula (IV) (X, Y = H) (70:30) | 1–2 | 2 | 1–2 |
| Comparative Example 11 | Monoazo dye of Formula (I) (β-modification)/ Monoazo dye of Formula (IV) (X, Y = H) (50:50) | 3 | 3–4 | 3 |

Note:

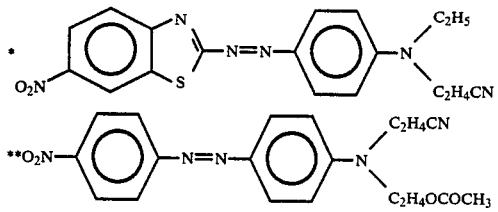

EXAMPLE 5

A mixture comprising 0.35 g of the monoazo dye of α-modification as prepared in Preparation Example 1 and 0.15 g of the monoazo dye as prepared in Preparation Example 2 was mixed with 0.5 g of a naphthalene-sulfonic acid-formaldehyde condensate, and the mixture was finely ground by means of a paint shaker. The resulting fine powder of the mixed dye was thoroughly blended with a stock paste having the following composition to obtain 100 g of a dye paste.

| Composition of Stock Paste: | |
|---|---|
| Carboxymethyl cellulose type thickener | 30 g |
| Tartaric acid | 0.2 g |
| Aromatic carrier ("Sanfloren SN", produced by Nikka Kagaku Kogyo K.K.) | 0.3 g |
| Water | 68.5 g |
| Total: | 99.0 g |

Polyester fabric was printed with the dye paste and intermediately dried at 100° C. Then, the fabric was subjected to steaming in superheated steam at 170° C. for 7 minutes to effect development, followed by soaping, washing with water, and drying. As a result, polyester fabric satisfactorily printed in red was obtained. The dyed fabric graded 6 in light fastness and 5 in rubbing fastness. Wet fastness after polyurethane finishing was as shown in Table 1.

COMPARATIVE EXAMPLES 5 TO 11

The same procedure of Example was repeated except for replacing the monoazo dye of Preparation Example 2 with a commercially available disperse dye ("CI-Dis-

EXAMPLES 6 TO 29

Dyeing of polyester fabric was carried out in the same manner as in Example 3 except for using a mixed dye shown in Table 2. The tone of the dyed fabric is shown in Table 2. After the dyed fabric was subjected to polyurethane finish, color fastness properties were measured. As a result, light fastness graded 6 in every case and fastness to perspiration (alkaline) was as shown in Table 2.

TABLE 2

| Example No. | Mixed Dye (Mixing Ratio) | Tone | Fastness to Perspiration (Alkaline) |
|---|---|---|---|
| 6 | Monoazo Dye of Formula (I) (α-modification)/ Monoazo Dye of Formula (IV) (X,Y = H) (10:90) | yellowish red | 4 |
| 7 | Monoazo Dye of Formula (I) (α-modification)/ Monoazo Dye of Formula (IV) (X,Y = H) (20:80) | yellowish red | 4–5 |
| 8 | Monoazo Dye of Formula (I) (α-modification)/ Monoazo Dye of Formula (IV) (X,Y = H) (30:70) | purplish red | 4–5 |
| 9 | Monoazo Dye of Formula (I) (α-modification)/ Monoazo Dye of Formula (IV) (X,Y = H) (40:60) | purplish red | 5 |
| 10 | Monoazo Dye of Formula (I) (α-modification)/ Monoazo Dye of Formula (IV) (X,Y = H) (60:40) | rubine | 5 |
| 11 | Monoazo Dye of Formula | bluish | 5 |

TABLE 2-continued

| Example No. | Mixed Dye (Mixing Ratio) | Tone | Fastness to Perspiration (Alkaline) |
|---|---|---|---|
|  | (I) (α-modification)/ Monoazo Dye of Formula (IV) (X,Y = H) (80:20) | rubine |  |
| 12 | Monoazo Dye of Formula (I) (α-modification)/ Monoazo Dye of Formula (IV) (X = Cl; Y = H) (90:10) | bluish rubine | 5 |
| 13 | Monoazo Dye of Formula (I) (α-modification)/ Monoazo Dye of Formula (IV) (X = Cl; Y = H) (10:90) | yellowish brown | 4-5 |
| 14 | Monoazo Dye of Formula (I) (α-modification)/ Monoazo Dye of Formula (IV) (X = Cl; Y = H) (20:80) | brown | 5 |
| 15 | Monoazo Dye of Formula (I) (α-modification)/ Monoazo Dye of Formula (IV) (X = Cl; Y = H) (30:70) | purplish red | 5 |
| 16 | Monoazo Dye of Formula (I) (α-modification)/ Monoazo Dye of Formula (IV) (X = Cl; Y = H) (40:60) | rubine | 5 |
| 17 | Monoazo Dye of Formula (I) (α-modification)/ Monoazo Dye of Formula (IV) (X = Cl; Y = H) (50:50) | rubine | 5 |
| 18 | Monoazo Dye of Formula (I) (α-modification)/ Monoazo Dye of Formula (IV) (X = Cl; Y = H) (60:40) | rubine | 5 |
| 19 | Monoazo Dye of Formula (I) (α-modification)/ Monoazo Dye of Formula (IV) (X = Cl; Y = H) (70:30) | rubine | 5 |
| 20 | Monoazo Dye of Formula (I) (α-modification)/ Monoazo Dye of Formula (IV) (X = Cl; Y = H) (80:20) | bluish rubine | 5 |
| 21 | Monoazo Dye of Formula (I) (α-modification)/ Monoazo Dye of Formula (IV) (X = Cl; Y = H) (90:10) | bluish rubine | 5 |
| 22 | Monoazo Dye of Formula (I) (α-modification)/ Monoazo Dye of Formula (IV) (X,Y = Cl) (10:90) | yellowish brown | 5 |
| 23 | Monoazo Dye of Formula (I) (α-modification)/ Monoazo Dye of Formula (IV) (X,Y = Cl) (30:70) | purplish red | 5 |
| 24 | Monoazo Dye of Formula (I) (α-modification)/ Monoazo Dye of Formula (IV) (X,Y = Cl) (40:60) | purplish red | 5 |
| 25 | Monoazo Dye of Formula (I) (α-modification)/ Monoazo Dye of Formula (IV) (X,Y = Cl) (50:5) | rubine | 5 |
| 26 | Monoazo Dye of Formula (I) (α-modification)/ Monoazo Dye of Formula (IV) (X,Y = Cl) (60:40) | rubine | 5 |
| 27 | Monoazo Dye of Formula (I) (α-modification)/ Monoazo Dye of Formula (IV) (X,Y = Cl) (70:30) | rubine | 5 |
| 28 | Monoazo Dye of Formula (I) (α-modification)/ Monoazo Dye of Formula (IV) (X,Y = Cl) (80:20) | bluish rubine | 5 |
| 29 | Monoazo Dye of Formula (I) (α-modification)/ Monoazo Dye of Formula (IV) (X,Y = Cl) (90:10) | bluish rubine | 5 |

As is apparent from the results of Examples and Comparative Examples, the benzothiazole type monoazo disperse dye according to the present invention, which is novel for its α-modification, has markedly superior dispersion stability to the conventional benzothiazole type monoazo disperse dye having β-modification. When it is used for dyeing of polyester fiber, such excellent dispersion stability can be exerted under any dyeing conditions, particularly high temperature and servere conditions employed to cope with the latest industrial rationalization to thereby effect level dyeing and provide dyed materials excellent in light fastness and rubbing fastness as well as wet fastness after post-finish. Accordingly, the monoazo dye of the present invention produces pronounced effects of high industrial value.

While the invention has been described in detail and with reference to specific embodiments thereof, it will be apparent to those skilled in the art that various changes and modifications can be made therein without departing from the spirit and scope thereof.

What is claimed is:

1. A monoazo dye for polyester fiber represented by formula (I)

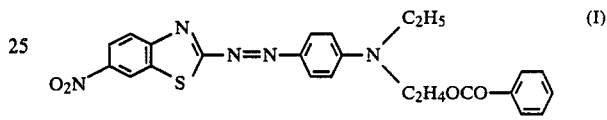

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 25.3°, and 26.8°.

2. A process for preparing a monoazo dye for polyester fiber represented by formula (I)

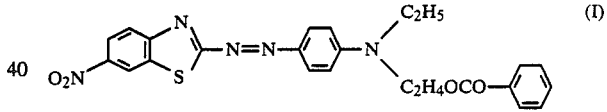

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 25.3°, and 26.8°, said monoazo dye which comprises diazotizing a compound represented by formula (II)

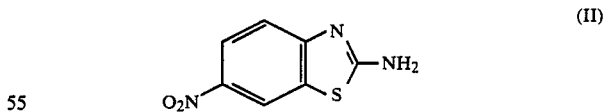

reacting the resulting diazo compound in an aqueous medium at a temperature of from 0° to 15° C. with a coupling component represented by formula (III)

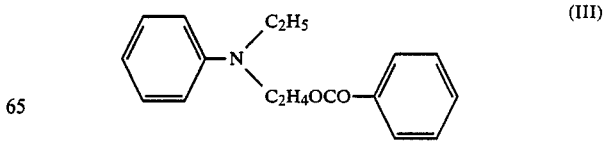

and further subjecting to a crystal transition.

3. A process for preparing a monoazo dye as in claim 2, wherein said crystal transition is carried out by stirring said compound in an aqueous medium at a temperature of from 60° to 130° C. for a period of from 0.5 to 30 hours or in an organic solvent at a temperature of from 15° to 80° C. for a period of from 0.5 to 10 hours.

4. A mixed dye for polyester fiber comprising a monoazo dye represented by formula (I)

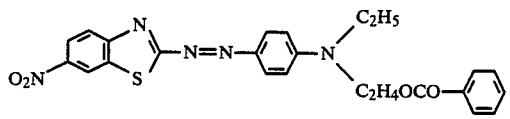

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 25.3°, and 26.8°, and a monoazo dye represented by formula (IV)

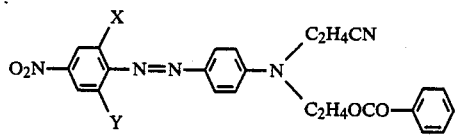

wherein X and Y each represents a hydrogen atom or a chloride atom in a mixing ratio of the monoazo dye of formula (I) to the monoazo dye of formula (IV) is from 10:90 to 90:10 by weight.

5. A mixed dye as in claim 4, wherein a mixing ratio of the monoazo dye of formula (I) to the monoazo dye of formula (IV) is from 50:50 to 90:10 by weight.

6. A mixed dye as in claim 4, wherein in formula (IV), X and Y each represents a hydrogen atom.

7. A method of dyeing polyester fiber comprising dip dyeing in an aqueous medium having dispersed therein a disperse dye in the presence of a dispersing agent in an amount twice or less the weight of the disperse dye at a dyeing temperature of from 125° to 140° C. and at a liquor ratio of 1:15 or less, wherein said disperse dye is a monoazo dye represented by formula (I)

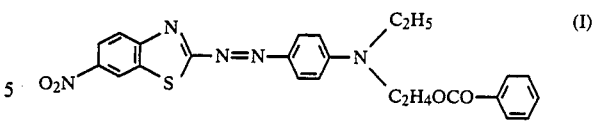

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 23.5°, and 26.8°.

8. A method of dyeing polyester fiber comprising dip dyeing in an aqueous medium having dispersed therein a disperse dye in the presence of a dispersing agent in an amount twice or less the weight of the disperse dye at a dyeing temperature of from 125° to 140° C. and at a liquor ratio of 1:15 or less, wherein said disperse dye is a mixed dye comprising a monoazo dye represented by formula (I)

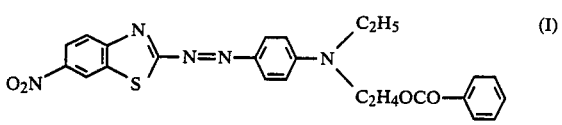

and having a crystal modification characterized by an X-ray diffraction spectrum (CuKα) showing a very strong peak at an angle of diffraction (2θ) of about 14.2°, a strong peak at about 24.5°, and four weak peaks at about 16.9°, 23.6°, 23.5°, and 26.8°, and a monoazo dye represented by formula (IV)

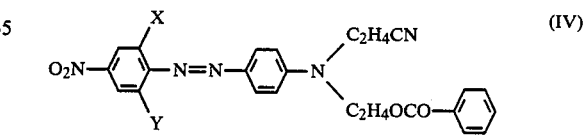

wherein X and Y each represents a hydrogen atom or a chlorine atom and mixing ratio of the monoazo dye of formula (I) to the monoazo dye of formula (IV) is from 10:90 to 90:10 by weight.

9. A method as in claim 8, wherein a mixing ratio of the monoazo dye of formula (I) to the monoazo dye of formula (IV) is from 50:50 to 90:10 by weight.

* * * * *